US012730208B2

(12) United States Patent
Excoffier et al.

(10) Patent No.: US 12,730,208 B2
(45) Date of Patent: Sep. 8, 2026

(54) METHOD FOR DETECTING THE PRESENCE OF A PERSON USING A COMMUNICATING DEVICE WITHIN AN ENVIRONMENT OF INTEREST

(71) Applicant: ORANGE, Issy-les-Moulineaux (FR)

(72) Inventors: David Excoffier, Chatillon Cedex (FR); Dinh Thuy Phan Huy, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 423 days.

(21) Appl. No.: 18/573,766

(22) PCT Filed: Jun. 22, 2022

(86) PCT No.: PCT/FR2022/051214

§ 371 (c)(1),
(2) Date: Dec. 22, 2023

(87) PCT Pub. No.: WO2022/269191

PCT Pub. Date: Dec. 29, 2022

(65) Prior Publication Data

US 2024/0288567 A1 Aug. 29, 2024

(30) Foreign Application Priority Data

Jun. 25, 2021 (FR) ...................................... 2106844

(51) Int. Cl.
*G01S 13/56* (2006.01)
*G01S 13/76* (2006.01)
*G06K 19/07* (2006.01)

(52) U.S. Cl.
CPC ............ *G01S 13/56* (2013.01); *G01S 13/765* (2013.01); *G06K 19/0723* (2013.01)

(58) Field of Classification Search
CPC ........ G01S 13/56; G01S 13/765; G01S 7/006; G01S 13/751; G06K 19/0723; H04W 4/02; H04W 4/80; H04W 4/023
See application file for complete search history.

(56) References Cited

U.S. PATENT DOCUMENTS 9,538,325 B2 * 1/2017 Friedman .............. G01S 13/767
2007/0069888 A1 * 3/2007 Parameswar ........... H04L 67/54 340/10.3

(Continued)

FOREIGN PATENT DOCUMENTS

WO 2019149341 A1 8/2019

OTHER PUBLICATIONS

International Search Report dated Sep. 23, 2022 for corresponding International Application No. PCT/FR2022/051214, filed Jun. 22, 2022.

(Continued)

*Primary Examiner* — Dhaval V Patel
(74) *Attorney, Agent, or Firm* — David D. Brush; Westman, Champlin & Koehler, P.A.

(57) ABSTRACT

A method for detecting presence of a person using a communicating device connected to a wireless communication network, within a determined environment in which a radiofrequency tag configured to backscatter ambient signals is located at a known geographical position. The method includes: transmitting over the wireless network, by the communicating device, an ambient signal within the environment; backscattering, by a the tag, the ambient signal to form a backscattered signal, the backscattered signal including identification data of the tag; receiving the backscattered signal by a network apparatus connected to the wireless network and obtaining, from the backscattered signal, the identification data of the tag and a network identifier of the communicating device; and recording, in a database, an item of presence information of the communicating device within the environment, which includes the identification data, the network identifier and a date of receipt of the backscattered signal.

14 Claims, 5 Drawing Sheets

(56) References Cited

U.S. PATENT DOCUMENTS

| | | | | |
|---|---|---|---|---|
| 2013/0127616 | A1* | 5/2013 | Robitaille ................ | G07C 9/20<br>340/539.13 |
| 2020/0202376 | A1 | 6/2020 | Benoliel et al. | |
| 2020/0359170 | A1* | 11/2020 | Werner ................. | G01S 13/765 |

OTHER PUBLICATIONS

Written Opinion of the International Searching Authority dated Sep. 23, 2022 for corresponding International Application No. PCT/FR2022/051214, filed Jun. 22, 2022.

English translation of the Written Opinion of the International Searching Authority dated Sep. 23, 2022 for corresponding International Application No. PCT/FR2022/051214, filed Jun. 22, 2022.

Pomárico-Franquiz, J. J. et al., "Accurate Self-Localization in RFID Tag Information Grids Using FIR Filtering", IEEE Transactions on Industrial Informatics, vol. 10, No. 2, pp. 1317-1326, May 2014.

Huynh, N. V. et al., "Ambient Backscatter Communications: A Contemporary Survey", IEEE communications Surveys & Tutorials, vol. 20, No. 4, Fourth Quarter 2018, pp. 2889-2922.

Yu, X. et al., "Resource Reservation Schemes for IEEE 802.11-Based Wireless Networks: A Survey", IEEE Communications Surveys & Tutorials, vol. 15, No. 3, Third Quarter 2013.

Fara, R. et al., "Ambient backscatters-friendly 5G networks: creating hot spots for tags and good spots for readers", in Proc. 2020 IEEE Wireless Communications and Networking Conference (WCNC), Apr. 6-9, 2020, Seoul, South Korea.

* cited by examiner

METHOD FOR DETECTING THE PRESENCE OF A PERSON USING A COMMUNICATING DEVICE WITHIN AN ENVIRONMENT OF INTEREST

CROSS-REFERENCE TO RELATED APPLICATIONS

This Application is a Section 371 National Stage Application of International Application No. PCT/FR2022/051214 filed Jun. 22, 2022, which is incorporated by reference in its entirety and published as WO 2022/269191 A1 on Dec. 29, 2022, not in English.

TECHNICAL FIELD

The present invention relates to the field of detecting individuals present within a considered environment. More specifically, the invention relates to a method for detecting the presence of an individual using a communicating device, within a determined environment in which at least one radio frequency tag is located that is placed in a known geographical position.

PRIOR ART

In the aforementioned field, one type of technical solution is known that is based on deploying passive radio frequency identification (RFID) tags within a considered environment. Users circulating within the considered environment are each equipped with a portable RFID reader that activates the RFID tags that are within their range. When the RFID reader of a user activates an RFID tag, the reader therefore can be located in the activation zone of the considered tag. An example of such a solution is described in document [1] entitled: "*Accurate Self-Localization in RFID Tag Information Grids Using FIR Filtering*", J. Pomárico-Franquiz and Y. S. Shmaliy, *IEEE Transactions on Industrial Informatics*, vol. 10, no. 2, pages 1317-1326 May 2014.

However, this type of solution notably requires users having an additional equipment, namely a portable RFID reader, which is expensive and of very limited use. In addition, the users have to change their habits in order to benefit from this service, namely having to remember to carry and activate the RFID reader.

Notably, the aim of the present invention is to overcome the disadvantages of the aforementioned known techniques.

DISCLOSURE OF THE INVENTION

According to a first aspect, the aim of the present invention is a method for detecting the presence of at least one individual using a communicating device connected to a wireless communication network, within a determined environment in which at least one radio frequency tag is located that is placed in a known geographical position and is configured for backscattering ambient signals. This method comprises the following steps of:

- transmitting, by the communicating device, an ambient signal within the environment, the ambient signal being transmitted in the wireless communication network;
- backscattering, by one of said tags, the ambient signal transmitted by the communicating device, in order to form a backscattered signal, the backscattered signal including an identification datum of the tag;
- receiving the backscattered signal by a network equipment connected to the wireless communication network, and obtaining, from the backscattered signal, the identification datum of the tag and a network identifier of the communicating device;
- recording, in a database, presence information of the communicating device within the environment, this presence information comprising at least the identification datum of the tag, the network identifier of the communicating device, and a date of receipt of the backscattered signal by the network equipment.

By virtue of the use of RF tags configured for ambient backscattering and with a range that is known or controlled beforehand, with the additional use of a network equipment (such as a relay antenna or a Wi-Fi terminal) already present on the wireless communication network, it is possible to effectively detect and then identify individuals present in a given location on a considered date. Indeed, the signals picked up by the network equipment originate (after backscattering by the tags) from radio signals that are commonly transmitted by the communicating devices in order to communicate via the wireless communication network, i.e., transmitted in the frequency bands usually used to communicate with a relay antenna (also called "base station") of a mobile telephony network.

The technique implemented according to the method of the invention notably has the following advantages compared with the known techniques of the prior art:

- In addition to the fact that the ambient backscattering tags are of limited cost, backscattering ambient signals does not require having to transmit new radio waves that are specifically used for detecting tags, since according to the invention a pre-existing ambient signal is used (broadcast by mobile telephony terminals, for example).
- With respect to the detection and reception of a signal backscattered by a tag, a common network equipment (for example, a relay antenna) is simply used that is already present on the wireless communication network.
- The ambient backscattering tags that are used offer the possibility of knowing or of easily adjusting the detection range or zone of the tag (see hereafter in the detailed description section), which allows a geographical zone to be monitored for identifying present individuals to be easily defined.

According to one embodiment of the method disclosed above, the ambient signal is transmitted in a frequency band allocated to the communicating device, the backscattered signal being transmitted in this frequency band, the network equipment being configured for obtaining the network identifier of the communicating device as a function of the determination of the frequency band.

The network equipment can thus split the signals (after backscattering) originating from each communicating device as a function of the frequency band allocated to the communicating device, and can then obtain the network identifier of the communicating device as a function of the determined frequency band. Furthermore, a network identifier (for example, a telephone number) of a current communication terminal allows the corresponding user to be easily identified.

According to another embodiment, alternative to the previous embodiment, the ambient signal transmitted by the communicating device comprises a message containing the network identifier of the communicating device.

Thus, a signal backscattered by a tag will also include the network identifier of the communicating device that transmitted the initial ambient signal, and this network identifier can be extracted after the backscattered signal is received by the network equipment.

According to a feature of the method disclosed above, the method further comprises obtaining at least one date for which the communicating device has resided within the environment, from the presence information of the communicating device recorded in the database and the geographical position of the tag.

This feature is notably obtained since the network equipment is configured to time-stamp the reception instants of a backscattered signal and to extract a tag identifier therefrom, then to integrate this information into the presence information. In practice, depending on the selected embodiment, it will be possible to obtain not only the dates on which communicating objects resided in the monitored environment, but also the corresponding presence times.

According to a feature of the method disclosed above, the method further comprises a step of identifying a group of individuals present within the environment on a determined date, as a function of the presence information recorded in the database, for this group of individuals.

According to one embodiment of the method, the aforementioned database resides in a processing server on a communication network accessible by the network equipment, the method further comprising a step of transmitting the presence information obtained by the network equipment to the processing server.

This embodiment offers the advantage of centralizing presence information relating to a set of user terminals on a server for processing presence information, which then can be remotely polled via a computer terminal, for example, of a company monitoring the considered environment.

According to one embodiment of the method, the wireless communication network is a mobile telephony network, the ambient signal transmitted by the communicating device being formed by a radio signal compliant with a mobile telephony protocol, the network equipment being incorporated in a relay antenna of said network.

In this embodiment, data or control signals that are usually transmitted by a mobile telephony terminal are used as the ambient signal source. This embodiment is particularly suitable for a relatively large outdoor monitored environment (for example, a stadium or a beach).

According to an alternative embodiment to the previous embodiment, the wireless communication network is a Wi-Fi network, the ambient signal transmitted by the communicating device being formed by a radio signal compliant with a wireless communication protocol according to a Wi-Fi standard, the network equipment being incorporated in a Wi-Fi access point.

In this embodiment, data or control signals usually transmitted by a communicating device connected to a local network, for example, a domestic network, such as a Wi-Fi network, are used as the ambient signal source; the communicating device can be, for example, a digital tablet or a smartphone. This embodiment is particularly suitable for an indoor monitored environment with a relatively limited surface area (for example, a restaurant).

According to other features for implementing the method according to the invention:

- the communicating device is a wireless communication terminal of the smartphone or connected digital tablet type;
- each radio frequency tag is affixed to an object located within the environment and representing a human activity undertaken in the environment.

For example, if the human activity involves frequenting a restaurant, a table in the restaurant can be selected as the object in the environment (restaurant) to which a radio frequency tag can be attached. According to another example, if the human activity involves frequenting a private beach, the object selected for affixing a tag thereto could be a parasol or a sun lounger positioned in a fixed and geographically determined location.

According to a second aspect, the invention relates to a network equipment connected to a wireless communication network, with this network equipment comprising a signal processing module configured for:

- receiving at least one backscattered signal transmitted by at least one radio frequency tag located within a determined environment, each backscattered signal being transmitted by one of said tags by backscattering an ambient signal transmitted by a communicating device, and including an identification datum of the tag;
- generating, for each backscattered signal received from a tag, presence information of a communicating device within the environment, this presence information comprising at least the identification datum of the tag, a network identifier of the communicating device, and a date of receipt of the backscattered signal by the network equipment;
- recording all the obtained presence information in a database.

According to a third aspect, the aim of the invention is a server for processing presence information of individuals using communicating devices within a determined environment, said server including a database intended to record presence information obtained by a network equipment as defined above, the server further comprising a software module for identifying individuals, the execution of which by a processor of the server allows identification of a group of individuals present within the environment on a considered date, as a function of the presence information stored in the database.

According to a particular embodiment, such a processing server can be incorporated into a network equipment as defined above.

According to a fourth aspect, the aim of the invention is a system for detecting the presence of individuals using communicating devices within a determined environment, this system comprising:

- at least one radio frequency tag that is placed in a known geographical position within the environment, with this tag being configured for backscattering ambient signals;
- a network equipment as defined above;
- a server for processing for processing presence information as defined above.

According to a fifth aspect, the invention relates to a software application (or computer program) comprising computer program instructions, the execution of which by a processor of a network equipment as disclosed above causes the steps of the method for detecting the presence of individuals, according to the invention, to be implemented, which steps are carried out in the network equipment.

Finally, according to a sixth aspect, the invention relates to a software application (or computer program) comprising computer program instructions, the execution of which by a processor of a server for processing presence information, as disclosed above, causes the steps of the method for detecting the presence of individuals, according to the invention, to be implemented, which steps are carried out in the processing server.

Such software applications according to the invention can use various programming languages, and comprise one or more program elements in the form of source code, object code, or of intermediate code between source code and object code, such as in a partially compiled format, or in any other desirable format.

Consequently, a further aim of the present invention is a storage medium that can be read by a computer system and which stores the instructions of a computer program as stated above. Such a storage medium can be formed by any entity or device capable of storing such a program. For example, such a medium can comprise a storage means, such as a ROM, for example, a CD-ROM or a microelectronic circuit ROM, or even a detachable storage medium such as a USB key or a magnetic recording medium, such as a hard disk. Furthermore, a program (or software application) according to the invention can be particularly downloaded over an Internet-type network.

The advantages provided by a network equipment, a server for processing presence information, a presence detection system, and software applications, according to the invention, as disclosed above, are identical to or contribute to those mentioned above in relation to the method for detecting the presence of at least one individual, according to the invention, and consequently will not be reviewed herein.

BRIEF DESCRIPTION OF THE DRAWINGS

Further features, details and advantages will become apparent from reading the following detailed description and with reference to the attached drawings, in which.

DETAILED DESCRIPTION

The present invention proposes a method for detecting the presence of at least one individual carrying a communicating device connected to a wireless communication network, within a determined environment in which at least one radio frequency tag is located that is placed in a known geographical position and is configured for backscattering ambient signals.

Such an environment can be, for example, a restaurant, a private beach, a museum or a shop such as a supermarket. In general, an environment in which the present method can be implemented is a site in which many individuals are likely to be present at the same time. By contrast, in some applications such as, for example, the surveillance of dangerous environments, implementing the method must make it possible to verify that no one is present in the environment, or, if individuals are detected as being present, to be able to evacuate them from the sites.

As previously disclosed, an environment in which a method according to the invention is implemented is previously fitted with radio frequency tags (RFID tags) placed in determined geographical positions. These tags are configured for backscattering ambient signals. The principle of ambient backscattering by a radio frequency tag (hereafter denoted "RF tag") is described hereafter.

The principle of ambient backscattering by RF tags is as follows: a source of radio waves, for example, an equipment transmitting radio waves for television, FM (Frequency Modulation) broadcasting waves, etc., emits radio waves into the environment in which it is located, i.e., ambient signals. An RF tag placed within range of the source can then receive an ambient signal (it is said to be "illuminated" by the source), and backscatter the received ambient signal; a radio wave reader located within transmission range of the RF tag will then be able to detect the ambient signal backscattered by the RF tag.

More information concerning ambient broadcasting and its applications can be found in document [2] entitled: "*Ambient Backscatter Communications: A Contemporary Survey*", Nguyen Van Huynh, Dinh Thai Hoang, Xiao Lu, Dusit Niyato, Ping Wang and Dong In Kim, IEEE communications Surveys & Tutorials, vol. 20, no. 4, Fourth Quarter 2018, pages 2889-2922.

Figure 1:
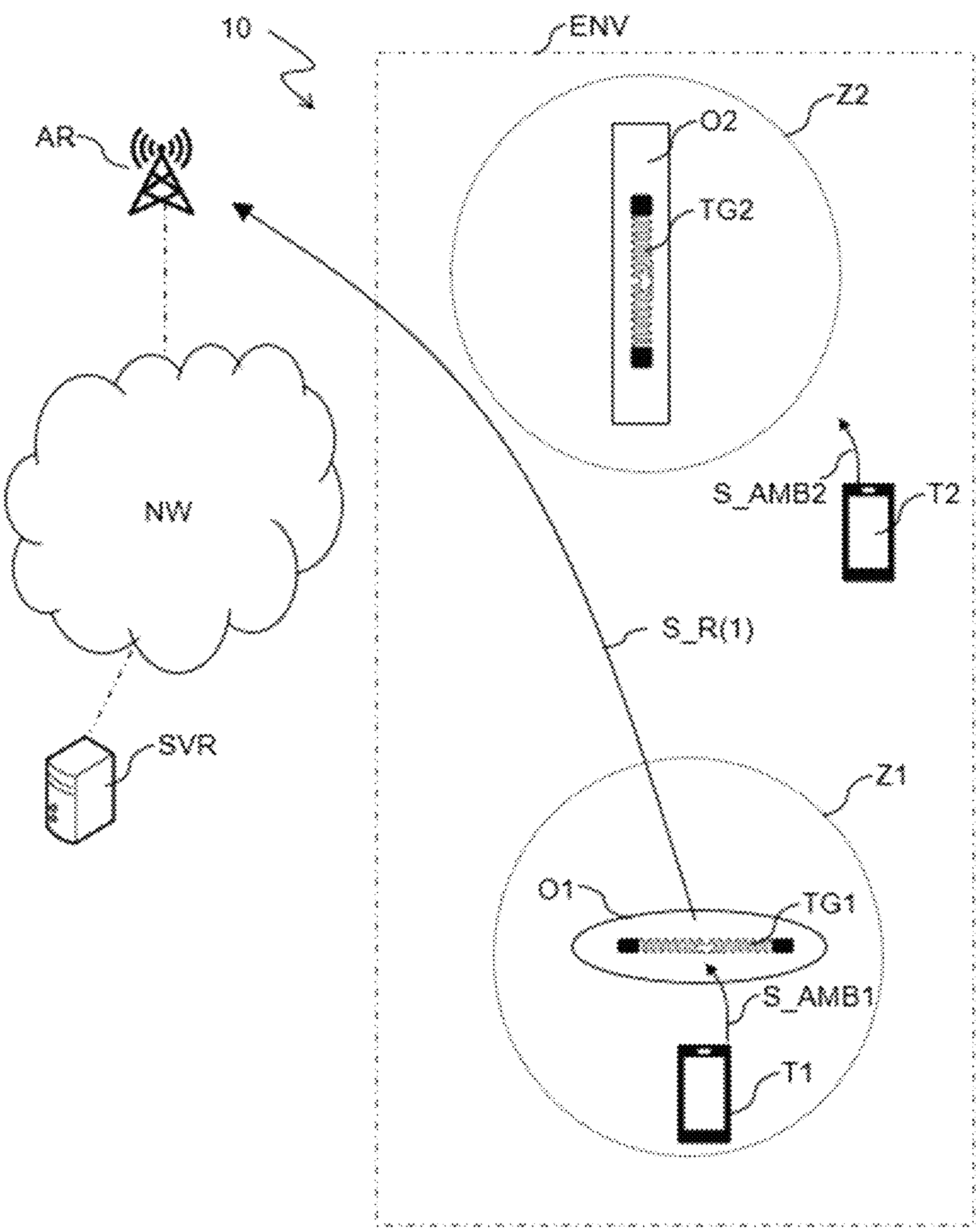
FIG. 1 is a diagram representing a system according to the invention for detecting the presence of individuals carrying communicating devices within a determined environment.

FIG. 1 shows a system according to the invention for detecting the presence of individuals carrying communicating devices within a determined environment.

Figure 2:
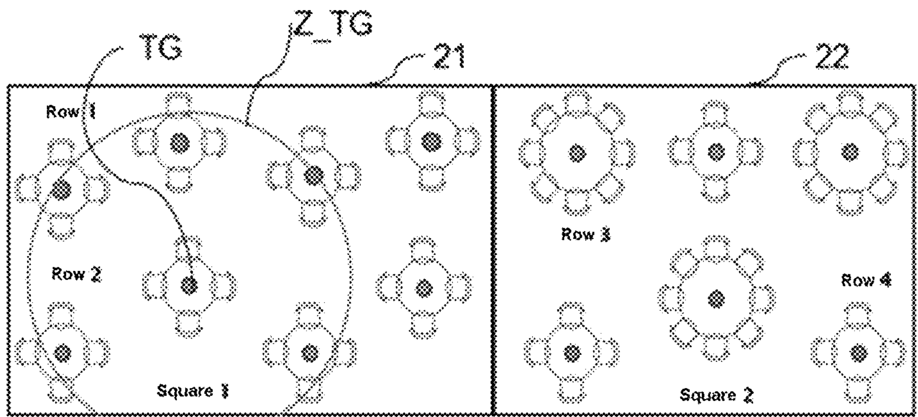
FIG. 2 represents an example of a first type of environment, in which a method for detecting the presence of at least one individual carrying a communicating device can be implemented, according to the invention.
Figure 3:
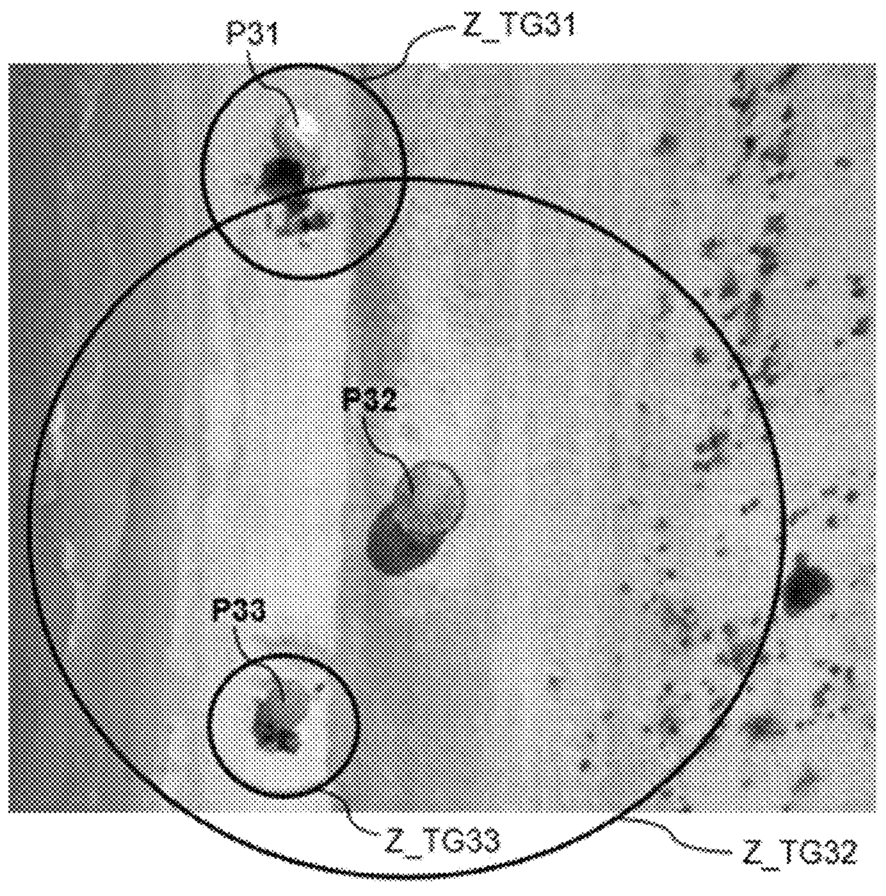
FIG. 3 represents an example of a second type of environment, in which a method for detecting the presence of at least one individual carrying a communicating device can be implemented, according to the invention.
Figure 4:
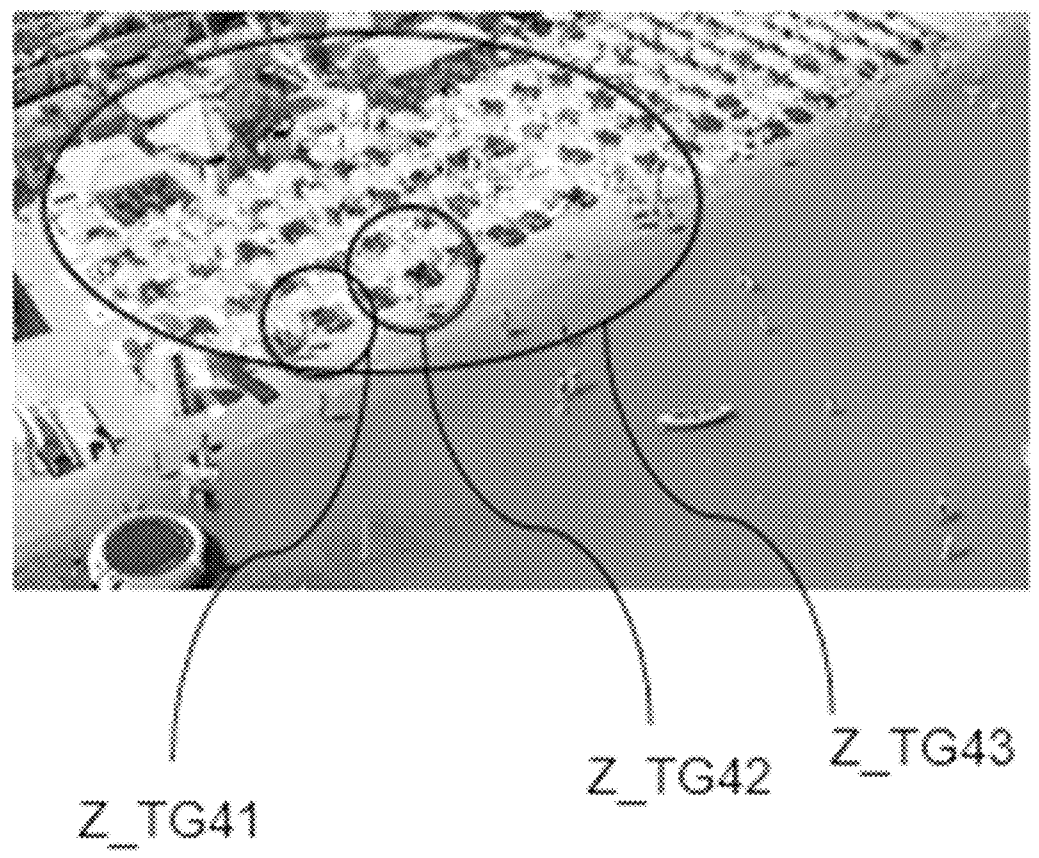
FIG. 4 is another illustration of an environment, according to the second type, in which a method for detecting the presence of at least one individual carrying a communicating device can be implemented, according to the invention.

As shown in FIG. 1, the system (10) for detecting the presence of individuals comprises an environment ENV, for example, a geographical zone located in an enclosed room such as, for example, a restaurant, a museum, a shop, or even a geographical zone defined by an outdoor expanse such as a beach. Examples of such environments are shown in FIGS. 2, 3 and 4 described below.

A set of RF tags configured for backscattering an ambient signal is placed in the environment ENV at selected and known geographical positions, for example, defined by GPS (Global Positioning System) coordinates. In FIG. 1, two RF tags, TG1 and TG2, are shown respectively attached to or more generally associated with physical objects O1 and O2. Within the context of the example of an environment shown in FIG. 2, corresponding to a restaurant, these objects are tables spread around the dining room of the restaurant, while in the example of an environment shown in FIGS. 3 and 4, corresponding to a private beach, the objects to which the RF tags are attached are parasols or sun loungers spread around the beach.

The system for detecting the presence of individuals comprises a network equipment AR, which, in the embodiment that is described and illustrated, is, or is incorporated into, a relay antenna of a wireless communication network, for example, a 3G, 4G or 5G ($3^{rd}$, $4^{th}$ or $5^{th}$ generation) type mobile telephony network. However, according to another embodiment, the network equipment AR is a Wi-Fi access point, also called Wi-Fi terminal (Wi-Fi or wifi: set of wireless communication protocols governed by the standards of the IEEE 802.11 group), i.e., hardware that grants access to a Wi-Fi wireless network allowing users of mobile phones, touchscreen tablets or laptops to connect to the Internet.

FIG. 1 also shows two communicating devices, T1 and T2, in the environment ENV that are respectively in the vicinity of the object O1 to which the tag TG1 is attached, and in the vicinity of the object O2 to which the tag TG2 is attached. These two communicating devices are, in the disclosed embodiment of the invention, mobile telephone terminals of the "smartphone" type; these terminals also can be connected both to a Wi-Fi wireless network and to a mobile telephone network. Each of the communicating devices T1 and T2 is carried by a different individual (not shown in the figure).

Each of the communicating devices T1 and T2 (also called "terminals" throughout the remainder of the description) transmits radio signals over the wireless communication network to which they are connected (4G or 5G telephony network, for example) that correspond to data or control signals compliant with a communication protocol corresponding to this network. The term "radio signal" is used herein to refer to an electromagnetic wave propagated by non-wired means, the frequencies of which are within the traditional spectrum of radio waves (a few hertz to several hundred gigahertz). The radio signals transmitted by the communicating devices T1 and T2 then form ambient signals, S_AMB1 and S_AMB2 respectively, which, by way of an example, are transmitted in the [811 MHZ, 821 MHz] transmission band within the context of 4G mobile telephony.

In FIG. 1, the tags TG1 and TG2 respectively correspond to the detection zones Z1 and Z2. Thus, as shown in FIG. 1, the terminal T2 is located outside the detection zones Z1 and Z2; consequently, none of the tags TG1 and TG2 can detect the ambient signal S_AMB2 transmitted by the terminal T2, and consequently none of the tags will backscatter the ambient signal transmitted by T2.

However, still in FIG. 1, the terminal T1 is located inside the detection zone Z1 of the tag TG1, which can then detect and receive the ambient signal S_AMB1 transmitted by the terminal T1, and consequently produce a backscattered signal S_R(1).

Still in FIG. 1, a network equipment AR, in this example a relay antenna AR connected to the wireless communication network to which the terminals T1 and T2 are connected, can receive signals backscattered by the tags TG1 and TG2, and in this example only the backscattered signal S_R(1), and consequently obtain presence information comprising at least one identification datum of the tag TG1, a network identifier for the terminal T1, and the date of receipt of the backscattered signal S_R(1). This process will be described in further detail hereafter with reference to FIG. 5.

In addition, the network equipment is connected by a wireless or wired network link to an Internet-type network NW. Similarly, each of the user terminals T1 and T2 can connect to the network NW, for example, via a mobile telephone communications network. Finally, FIG. 1 shows a server SVR that can be accessed by the network equipment AR. The role of the server SVR is described hereafter.

With respect to the detection zone of an RF tag configured for backscattering an ambient signal, this depends on the level of illumination of the tag by the ambient signal, as described in document [3] entitled: "Ambient backscatters-friendly 5G networks: creating hot spots for tags and good spots for readers", Romain Fara, Dinh-Thuy Phan-Huy, Marco Di Renzo, in Proc. 2020 IEEE Wireless Communications and Networking Conference (WCNC), 6-9 Apr. 2020, Seoul, South Korea (accessible via: https://arxiv.org/abs/2002.00884).

Several methods exist for determining the detection zone of a tag. According to a first method, a test smartphone can be used beforehand to carry out a measurement campaign in order to determine the geographical zone within which the tag is detected, via the signal that it backscatters. According to another method described in document [3], the detection zone of a considered RF tag can be controlled by ensuring that part of the ambient signal is focused on the tag and by increasing the level of illumination of the tag. More specifically, during a first learning phase, a learning receiver device (smartphone) is positioned in the location where the tag will be deployed, then the receiver device is used to train the ambient signal transmitter device to focus the signal toward the receiver device. During a second phase, the learning receiver device is replaced by the RF tag, which can then receive an ambient signal focused toward it. Finally, in order to adjust the size of the detection zone for a given RF tag, a learning smartphone can be positioned at a selected limit detection distance (the detection zone for a tag on the ground is substantially a disk with the tag at its center) and then, depending on whether or not the backscattered signal is detected by the smartphone, the transmission power of the ambient signal transmitted by the transmitter device is gradually adapted until the smartphone detects the signal backscattered by the tag.

FIG. 2 shows a first example of an environment in which a method for detecting the presence of at least one individual carrying a communicating device can be implemented. In this example, the environment is a restaurant comprising tables spread over two rooms 21 (square 1) and 22 (square 2). A radio frequency tag TG is placed in the center of each of the tables and is associated with a detection zone Z_TG. In this example, the ambient signal can be broadcast by a Wi-Fi terminal associated with the restaurant, for example.

In the case, for example, of identifying individuals carrying the Covid-19 disease, when an individual who was present in the restaurant on a given date is subsequently detected as being a carrier of the disease, it will then be possible to find the individuals who shared their table or even who were present on neighboring tables on the same date. Indeed, it will be possible to identify these individuals by virtue of the presence information obtained via the interaction of the communicating device (smartphone, for example) carried by each of these individuals, with the RF tags placed on the tables. This presence information optionally can be correlated with the information held by the restaurant owners (computerized customer list, for example).

FIGS. 3 and 4 illustrate a second example of an environment in which a method for detecting the presence of at least one individual carrying a communicating device can be implemented. In this example, the environment is a private beach on which parasols for hire are each equipped with an RF tag configured for backscattering an ambient signal broadcast by a relay antenna of a 4G mobile telephony network. The beach is therefore divided into detection zones for the tags attached to the parasols.

As shown in FIG. 3, the parasols P31 and P33 are respectively associated with tags TG31 and TG33 (not shown), the detection zone of which is Z_TG31 and Z_TG33 respectively, while the parasol P32 is associated with a tag TG32 (not shown), the detection zone Z_TG32 of which is much larger.

FIG. 4 illustrates another example of a private beach where parasols (or sun loungers) are each equipped with an RF tag. Some of these tags have a limited detection zone, Z_TG41 and Z_TG42, allowing individuals equipped with communicating devices in the vicinity of the parasols to which the tags are affixed to be identified; other tags, by contrast, have a larger detection zone, such as Z_TG43, allowing individuals entering or leaving the detection zone of the corresponding tag to be identified.

Figure 5:
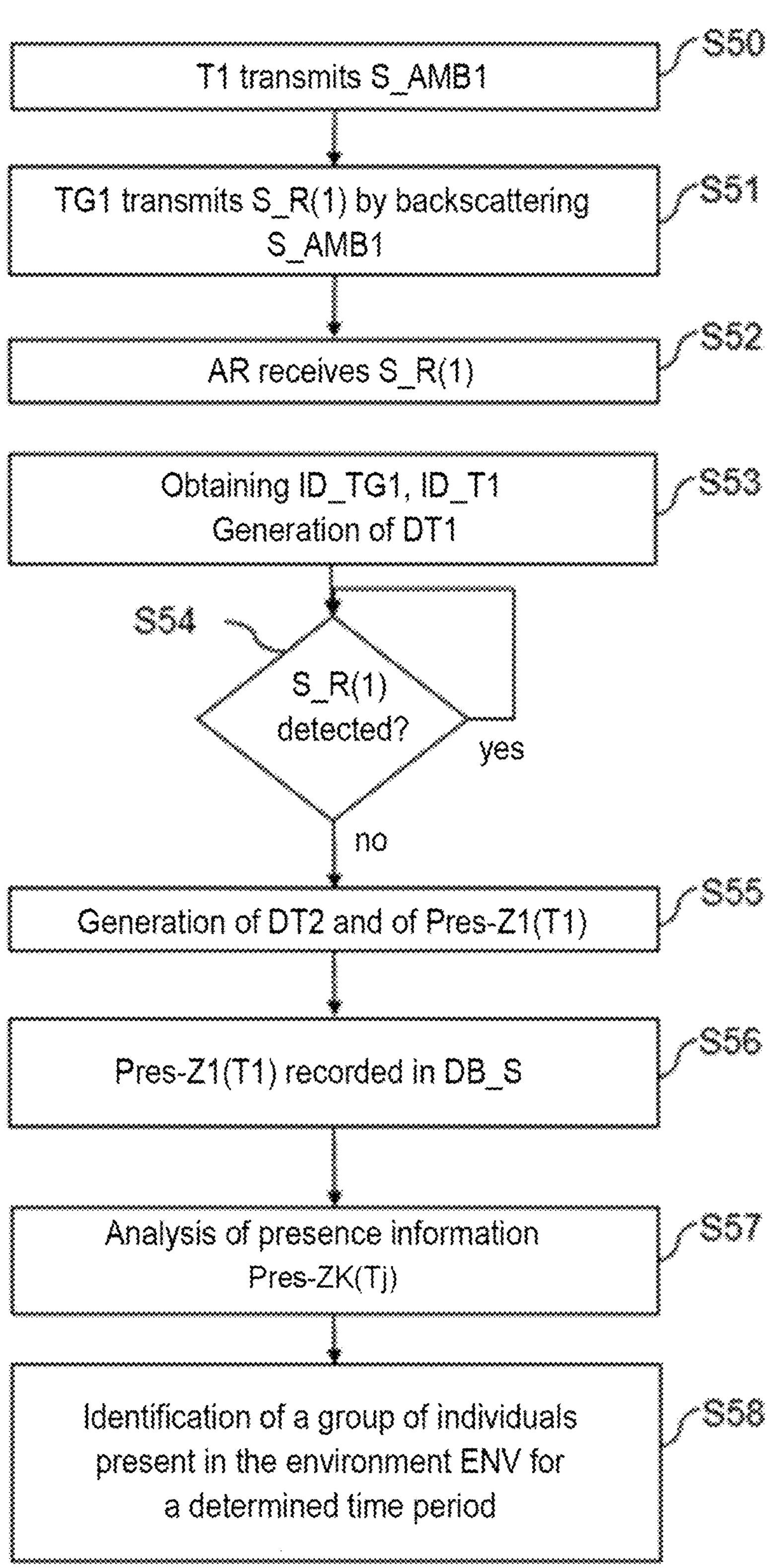
FIG. 5 represents a flowchart illustrating the main steps of a method for detecting the presence of at least one individual carrying a communicating device connected to a wireless communication network, within a determined environment.

With reference to FIG. 5, the main steps of a method for detecting the presence of at least one individual wearing a device connected to a wireless communication network, within a determined environment, will now be described. This environment can be an enclosed and covered site such as a building or a defined outdoor site, as illustrated by the examples described above with reference to FIGS. 2, 3 and 4.

In the considered environment (for example, a restaurant), a group of individuals is present for a given period of time and on a given date, each using a communicating device carried by the individual (for example, in a pocket) or even located in the vicinity of the individual (for example, placed on a table). In the embodiment described, such a communicating device is a smartphone (hereafter also called user terminal) connected to a mobile telephony network (4G, for example).

The considered geographical environment has a set of at least one radio frequency (RF) tag placed in a known or determined geographical position. As previously disclosed (see above with reference to FIG. 1), each of the tags is configured for backscattering ambient signals transmitted by user terminals respectively located in the detection zone of the considered tag. The environment can be, for example, an enclosed site, such as a restaurant or a museum, but also an open space, such as a football stadium comprising stands for the spectators, with rows of seats, some of which include an RF tag (for example, every second seat per row of seats).

In addition, each tag is associated with a tag identification datum allowing the tag or the object to which it is attached or affixed to be identified. A list of tags is created and stored beforehand, for example, in a server (server SVR in FIG. 1) connected to an Internet-type network or a private computer network (intranet); this list particularly contains an association between each tag identifier and geographical coordinates, for example, GPS coordinates.

With further reference to the environment ENV shown in FIG. 1, the method for detecting the presence of individuals, as illustrated by the flowchart in FIG. 5, begins with a step S50, during which the communication terminal T1, carried by an individual and located in the detection zone Z1 of the tag S_R(1), transmits an ambient signal S_AMB1 over the wireless communication network to which the terminal T1 is connected (as well as the network equipment AR).

In step S51, the tag TG1 receives the ambient signal S_AMB1 and backscatters it in the form of a signal S_R(1) that includes an identification datum (ID_TG1) of the tag. The backscattered signal S_R(1) is then received by the network equipment AR in step S52.

In step S53, a signal processing module (or software application AP-6, see FIG. 6) incorporated in the network equipment AR analyses the backscattered signal S_R(1) and extracts the tag identifier ID_TG1 therefrom. In addition, a first time datum DT1 representing the reception instant of the backscattered signal is also generated.

Still in step S53, the network equipment processing module retrieves, from the backscattered signal, an identifier (ID_T1) of the communication terminal T1 transmitting the ambient signal S_AMB1. To this end, as already disclosed above, two different techniques can be implemented.

According to the first technique, as the ambient signal S_AMB1 is transmitted by the terminal T1 in a frequency band that is allocated thereto, the network equipment processing module is configured to split the signals originating from various terminals (using a signal splitting technique that is known in the prior art). Then, once the frequency band of the received backscattered signal has been identified, the processing module consults a register in which associations between allocated frequency bands and corresponding terminal network identifiers have been previously stored.

According to the second technique, the ambient signal (S_AMB1) transmitted by the terminal T1 includes a message containing the network identifier (ID_T1) of the terminal, and since the backscattered signal S_R(1) retains this message, the terminal network identifier can be directly extracted from the backscattered signal received by the network equipment.

During the test step S54, the processing module (AP-6) of the network equipment AR monitors the state of reception by the network equipment of the backscattered signal S_R (1). As long as the backscattered signal is received (S54 "yes"), monitoring continues. When the signal S_R(1) is no longer received (S54 "no"), in particular when the terminal T1 leaves the detection zone Z1 of the tag TG1, with the tag S_R(1) no longer receiving the ambient signal S_AMB1, the application AP-6 of the network equipment AR generates, in step S55, a second time datum DT2 representing the end of reception instant of the backscattered signal, as well as presence information Pres-Z1(T1) of the terminal T1 in the geographical zone corresponding to the detection zone Z1 of the tag TG1, with this presence information being formed by the identifier ID_TG1 of the tag, the aforementioned time data DT1 and DT2, as well as a network identifier of the terminal T1 (ID_T1), for example, a mobile telephone number associated with the SIM (subscriber identity/identification module) card of the terminal.

In step S56, the presence information Pres-Z1(T1) is stored in a database (or register) DB. According to a first alternative embodiment, the database DB is integrated into the server SVR for processing presence information (database DB_S), accessible via the network NW (see FIG. 1). According to this alternative embodiment, the network equipment AR transmits the obtained presence information to the server SVR.

According to a second alternative embodiment, the aforementioned database is distributed between the network equipment AR and the server SVR. For example, a database DB_6 is integrated in the network equipment AR, and in which the application AP-6 of the network equipment records the presence information Pres-Zk(Tj) generated over time for backscattered signals received from a set of tags TGk within the environment, and for which the corresponding ambient signal has been transmitted by any terminal Tj present in the environment. Then, the network equipment AR can periodically transmit the presence information Pres-Zk(Tj) generated over a considered time period to the server SVR.

The server SVR can, for example, then record, in its local database DB_S, and keep updated, presence information received from a set of network equipment AR.

In step S57, the server SVR can, on request, analyze the presence information stored in the database DB_S and previously received from one or more network equipments (AR), in order to identify (step S58) users present on a given date (or in a given time period) in a geographically determined site. The individuals can be identified on the basis of the network identifier associated with their communication terminal, the transmitted ambient signal of which has been detected by a radio frequency tag in the considered site.

Figure 6:
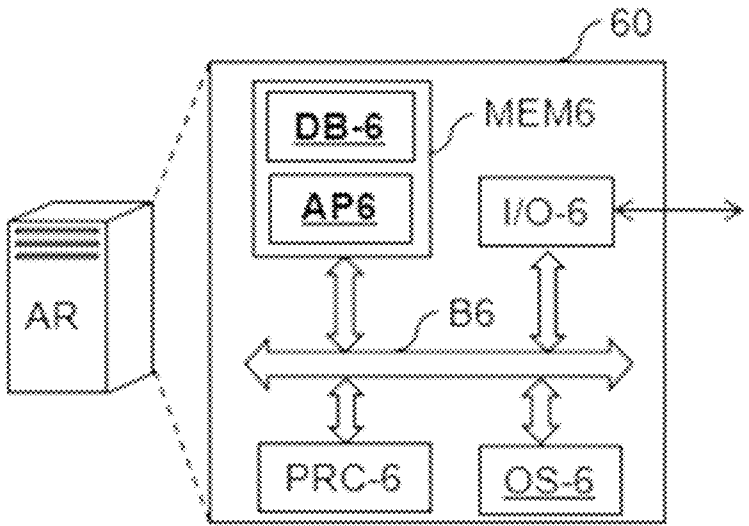
FIG. 6 represents the hardware and software architecture of a network equipment according to the invention.

FIG. 6 shows the hardware architecture of a network equipment according to the invention. As shown in FIG. 6, such a network equipment AR, in this example a mobile telephony network relay antenna or a Wi-Fi access point, is made up of elements arranged according to a computer hardware architecture (60). More specifically, this architecture comprises:

- A network communication interface module (I/O-6), capable of establishing communication sessions according to a communication protocol, for example, such as an HTTP (HyperText Transfer Protocol) or HTTPS (HyperText Transfer Protocol Secure) type protocol, on the network NW for communicating with the server SVR.
- A memory module MEM-6 of the ROM or RAM type which stores software modules associated with a set of applications installed in the network equipment, and notably the module AP-6 (or application) for processing backscattered signals, according to the invention, associated with the database DB-6 storing the presence information generated by the application AP-6. The application AP-6 notably comprises software components each respectively responsible for implementing some of the steps of the method for detecting the presence of individuals, according to the invention. The aforementioned components are controlled by the operating system OS-6 of the network equipment.
- A processor (PRC-6) communicating via a set of one or more data buses (B6) with the aforementioned modules of the terminal.
- An operating system module (OS-6) managing the interaction between the various modules and the processor (PRC-6) of the network equipment AR.

Figure 7:
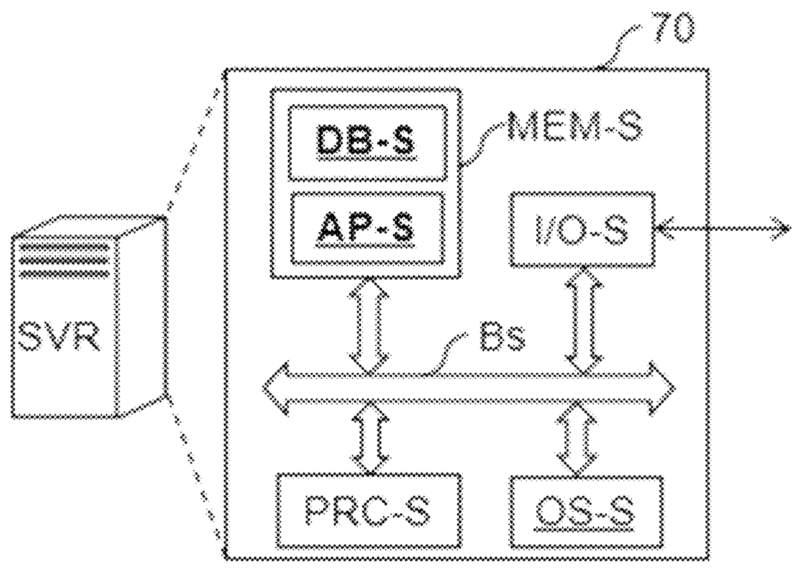
FIG. 7 represents the hardware and software architecture of a server for processing presence information according to the invention.

FIG. 7 shows the hardware and software architecture of a server for presence information according to the invention. As shown in FIG. 7, the server SVR for presence information is also formed by elements arranged in accordance with a computer hardware architecture 70. This architecture notably comprises a processor (PRC-S) and memory components (MEM-S) of the ROM and RAM type, communicating via one or more data buses (Bs). From a functional point of view, the server SVR comprises the following modules:

- A network communication interface module I/O-S, responsible for communicating with the network NW, notably in order to receive requests to transfer presence information from network equipment, such as the network equipment AR. In practice, according to one embodiment, the aforementioned requests use a communication protocol, such as the HTTP or HTTPS protocol.
- A memory module MEM-S that stores the executable code of an application AP-S associated with the aforementioned database DB-S, the execution of which by the processor (PRC-S) notably causes operations for identifying individuals present in a considered geographical zone to be implemented, on the basis of presence information received from network equipment, such as the network equipment AR, and stored in the database DB-S.
- An operating system module (OS-S) managing the interaction between the processor PRC-S and the various modules of the server.

Applications of the Invention

The method according to the invention that is described above can be generally applied to any situation requiring the identification of a group of individuals in a particular geographical environment. Non-exhaustive examples of situations in which the invention can be implemented are provided hereafter.

(1)—In the event of an epidemic/pandemic of contagious diseases, such as the 2019 coronavirus disease ("Covid-19"), to combat the spread of the disease by identifying individuals ("contact cases") in contact with one another, on a given date, in an enclosed frequented site (supermarket, restaurant, bar, company or administration premises, beach, swimming pool, school, etc.) in order to notify them of the fact that they have been in close proximity to an individual declared to be a carrier of the disease and to offer them a screening test for the disease.

(2)—In an "at-risk" workplace, such as a laboratory or factory, where, for example, hazardous products are handled or stored, in order to identify individuals present in the workplace on a given date, after contamination by a hazardous substance or an industrial accident has occurred in the workplace.

(3)—As part of the prevention of a major risk such as the imminent breach of a dike or a dam detected in a precise but fairly large geographical zone, in order to identify a group of individuals present in this zone so as to be able to inform them and allow them to evacuate the area.

(4)—After a disaster has occurred in a public site, for example, the collapse of a stand in a stadium or a fire in an enclosed site (for example, a concert hall), in order to be able to identify the individuals present when the event occurred.

(5)—When individuals are moving around a site, such as a museum or a concert hall, in order to identify them in real time and provide them, via their smartphone, with individualized information about the works that are being played or exhibited.

The invention claimed is:

1. A method for detecting presence of at least one individual using a communication terminal connected to a wireless communication network, within a determined environment in which at least one radio frequency tag is located that is placed in a known geographical position and is configured for backscattering ambient signals, said method comprising:

transmitting, by the communication terminal, an ambient signal within said environment, said ambient signal being transmitted in the wireless communication network;

backscattering, by one of said tags, the ambient signaltransmitted by the communication terminal, in order to form a backscattered signal, said backscattered signal including an identification datum of the tag;

receiving the backscattered signal by a network equipment connected to the wireless communication network, and obtaining, from the backscattered signal, the identification datum of the tag and a network identifier of the communication terminal; and recording, in a database, presence information of the communication terminal within said environment, said presence information comprising at least the identification datum of the tag, the network identifier of the communication terminal, and a date of receipt of the backscattered signal by said network equipment, for detecting the presence of the at least the individual using the communication terminal within the determined environment as a function of the presence information.

2. The method as claimed in claim 1, wherein the ambient signal is transmitted in a frequency band allocated to the communication terminal, the backscattered signal being transmitted in said frequency band, said network equipment being configured for obtaining the network identifier of the communication terminal as a function of the determination of said frequency band.

3. The method as claimed in claim 1, wherein the ambient signal transmitted by the communication terminal comprises a message containing said network identifier of the communication terminal.

4. The method as claimed in claim 1, further comprising obtaining at least one date for which the communication terminal has resided within said environment, from the presence information of the communication terminal recorded in said database and the geographical position of said tag.

5. The method as claimed in claim 4, further comprising identifying a group of individuals present within said environment on a determined date, as a function of the presence information recorded in the database, for this group of individuals.

6. The method as claimed in claim 1, wherein said database resides in a processing server on a communication network accessible by the network equipment, the method further comprising transmitting presence information obtained by said network equipment to the processing server.

7. The method as claimed in claim 1, wherein the wireless communication network is a mobile telephony network, the ambient signal transmitted by the communication terminal being formed by a radio signal compliant with a mobile telephony protocol, said network equipment being incorporated in a relay antenna of said network.

8. The method as claimed in claim 1, wherein the wireless communication network is a Wi-Fi network, the ambient signal transmitted by the communication terminal being formed by a radio signal compliant with a wireless communication protocol according to a Wi-Fi standard, said network equipment being incorporated in a Wi-Fi access point.

9. The method as claimed in claim 1, wherein the communication terminal is a wireless terminal of the smartphone or connected digital tablet type.

10. The method as claimed in claim 1, wherein each radio frequency tag is affixed to an object located within said environment and representing a human activity undertaken in the environment.

11. A network equipment connected connectable to a wireless communication network, said network equipment comprising:

at least one processor; and at least one non-transitory computer readable medium comprising instructions stored thereon which when executed by the at least one processor configure the network equipment to:

receive at least one backscattered signal transmitted by at least one radio frequency tag located within a determined environment, each backscattered signal being transmitted by one of said tags by backscattering an ambient signal transmitted by a communication terminal, and including an identification datum of the tag;

generate, for each backscattered signal received from a tag, presence information of a communication terminal within said environment, said presence information comprising at least the identification datum of the tag, a network identifier of the communication terminal, and a date of receipt of the backscattered signal by said network equipment; and record, in a database, all the presence information obtained for detecting the presence of at least one individual using the communication terminal within the determined environment as a function of the presence information.

12. A system comprising:

network equipment connectable to a wireless communication network, said network equipment comprising:

at least one processor; and at least one non-transitory computer readable medium comprising instructions stored thereon which when executed by the at least one processor configure the network equipment to connect to a wireless communication network and to:

receive at least one backscattered signal transmitted by at least one radio frequency tag located within a determined environment, each backscattered signal being transmitted by one of said tags by backscattering an ambient signal transmitted by a communication terminal, and including an identification datum of the tag;

generate, for each backscattered signal received from a tag, presence information of a communication terminal within said environment, said presence information comprising at least the identification datum of the tag, a network identifier of the communication terminal, and a date of receipt of the backscattered signal by said network equipment; and record, in a database, all the presence information obtained for detecting the presence of at least one individual using the communication terminal within the determined environment as a function of the presence information;

a server comprising:

the database to record the presence information obtained by the network equipment;

at least one further processor; and at least one further non-transitory computer readable medium comprising instructions stored thereon which when executed by the at least one further processor configure the server to:

process the presence information of individuals using the communication terminal and other communication terminals within the determined environment, to identify a group of individuals present within said environment on a considered date, as a function of the presence information stored in said database.

13. The network equipment of claim 11, wherein the network equipment further comprises a server for processing the presence information of individuals using the communication terminal and other communication terminals within the determined environment, said server including the database to record the presence information obtained by the network equipment and being configured to identify of a group of individuals present within said environment on a considered date, as a function of the presence information stored in said database.

14. A system for detecting the presence of individuals using communication within the determined environment, said system comprising:

the at least one radio frequency tag that is placed in the known geographical position within said environment, and is configured for backscattering the ambient signals;

the network equipment as claimed in claim 11; and a server for processing the presence information.

* * * * *